US006625631B2

(12) United States Patent
Ruehle (10) Patent No.: US 6,625,631 B2
(45) Date of Patent: Sep. 23, 2003

(54) COMPONENT REDUCTION IN MONTGOMERY MULTIPLIER PROCESSING ELEMENT

(75) Inventor: Michael D. Ruehle, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 190 days.

(21) Appl. No.: 09/966,044

(22) Filed: Sep. 28, 2001

(65) Prior Publication Data

US 2003/0065695 A1 Apr. 3, 2003

(51) Int. Cl.[7] .................................................. G06F 7/38
(52) U.S. Cl. ........................................................ 708/491
(58) Field of Search ................................. 708/491–492; 380/28

(56) References Cited

U.S. PATENT DOCUMENTS 6,061,706 A * 5/2000 Chen et al. .................. 708/491

FOREIGN PATENT DOCUMENTS

EP        0 350 278    *  1/1990

OTHER PUBLICATIONS

Guo et al, "A Novel Digit–Serial Systolic Arrray For Modular Multiplication", IEEE 1998, pp. 177–180.*
Kornerup, A Systolic, Linear–Array Multiplier for a Class of Right–Shift Algorithms, IEEE Trans. on Computers, vol. 43, No. 8 Aug. 1994 pp. 892–898.*
U. S. Patent Application Publication U.S. 2002/0120658 A1, Aug. 29, 2002.*
Thomas Blum, Modular Exponentiation on Reconfigurable Hardware, Thesis Submitted to the Faculty of the Worcester Polytechnic Institute, Apr. 8, 1999.

* cited by examiner

Primary Examiner—Tan V. Mai
(74) Attorney, Agent, or Firm—John F. Travis (57) ABSTRACT

A Montgomery multiplier circuit with a chain of processing elements uses less circuit logic in each processing element by propagating an initial parameter through registers used for other purposes. An accumulation register in each processing element is used to propagate the initial parameter through the chain. In one embodiment the initial parameter is first propagated through address registers until it reaches the end of the chain, and is then looped back through the accumulation registers in the reverse direction. In one embodiment, multiples of at least one parameter used in a Montgomery multiplication are pre-calculated in the processing elements of the Montgomery multiplier using the same logic elements used in performing the Montgomery multiplication.

23 Claims, 4 Drawing Sheets

COMPONENT REDUCTION IN MONTGOMERY MULTIPLIER PROCESSING ELEMENT

BACKGROUND OF THE INVENTION

1. Field of the Invention

The invention pertains generally to computers. In particular, it pertains to processing elements used in a Montgomery multiplier.

2. Description of the Related Art

A number of applications, including public key data encryption/decryption such as the Rivest-Shamir-Adleman (RSA) algorithm, employ algorithms that use a combination of multiplication and modular reduction on large numbers. In particular, the RSA algorithm repeatedly implements the operation X Y mod Z (the remainder of X times Y divided by Z). When dealing with large numbers (such as 1024-bit numbers which are common in RSA-based data security), this algorithm includes at least two time-consuming operations (a multiplication and a division), and detection of a remainder. Montgomery multipliers are frequently used to implement this algorithm. Montgomery multipliers use a transform to perform X Y mod Z in a single operation by transforming X, Y, and Z into other numbers such as A, B, and M, performing a transformed operation, and reverse-transforming the result. With a long sequence of multiplies, if the transformed operation is less time consuming than the actual operation, the total time to determine a final answer can be significantly less with the Montgomery multiplier.

Some Montgomery multipliers use a linear systolic array, i.e., a chain of identical processing elements (PEs), with each PE working on a portion (for example four bits) of each of the numbers involved. The chain contains enough PEs to hold the largest of the numbers involved, including interim results. Interim information is fed in both directions between adjacent PEs during the operation.

In a conventional linear systolic array Montgomery multiplier (LSAMM), two of the three parameters (typically B and M), are pre-loaded into the PEs through buses connected to every PE. The connections needed to route multi-bit buses to hundreds of PEs adds considerable complexity to the circuit. A conventional LSAMM also incorporates a decoding circuit in every PE to decode a multi-bit carry operation. Each PE must include circuitry dedicated to performing the bus interface and carry decode operations, so the total circuitry required for bus operation and multi-bits carries can be determined by multiplying this extra logic by the number of PEs in the LSAMM. Since Montgomery multipliers are frequently implemented in a field programmable gate array (FPGA) with a fixed amount of available circuitry, all that extra logic consumes many gates that could otherwise be used to increase the number of PEs, or could be devoted to other functions.

Multiples of at least one parameter must be loaded into a conventional Montgomery multiplier before a Montgomery multiplication begins. Pre-calculating these multiples of very large numbers in software is a time-consuming process that slows down any operation requiring Montgomery multiplications.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

The invention may be implemented in hardware, software, or firmware. The invention may also be implemented as instructions stored on a machine-readable medium, which may be read and executed by at least one processor to perform the operations described herein. In one embodiment a set of one or more processors executes instructions to cause a Montgomery multiplier to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

Various portions of the description refer to parts of the invention with the terms 'right', 'left', 'right-hand', 'left-hand', 'right-most', or 'left-most'. These terms refer to relative orientation as shown in the figures, and should not be interpreted as limitations on the physical implementation of the invention.

Various embodiments use a linear systolic array Montgomery multiplier (LSAMM) design to load the bits of initial parameters into a particular processing element (PE) and propagate those bits through a serially-connected chain of PEs, thus eliminating the need for a bus connected to all PEs in parallel. Having the PEs connected in a serial chain does not prevent groups of bits from being transferred between PEs in parallel. In the context of the invention, 'propagate' refers to passing groups of bits from PE to PE in a chain of PEs. 'Propagating through' a particular PE includes any of: 1) starting the propagation (a group of bits is not received from an adjacent PE but is delivered to another adjacent PE), 2) ending the propagation (a group of bits is received from an adjacent PE but is not delivered to another adjacent PE), and 3) continuing the propagation (a group of bits is received from an adjacent PE and is delivered to another adjacent PE). Propagating does not require that every group of bits reach every PE in the chain.

In one embodiment, the LSAMM also performs pre-calculations of all required multiples of the parameters, using the same circuitry that performs the Montgomery multiplication. Making multiple uses of various circuit elements reduces the amount of logic needed per PE when compared with a conventional LSAMM. In one embodiment, the Montgomery multiplier is implemented in an FPGA with a fixed amount of available logic. The savings in circuitry can be used to include more PEs in the FPGA.

Figure 1:
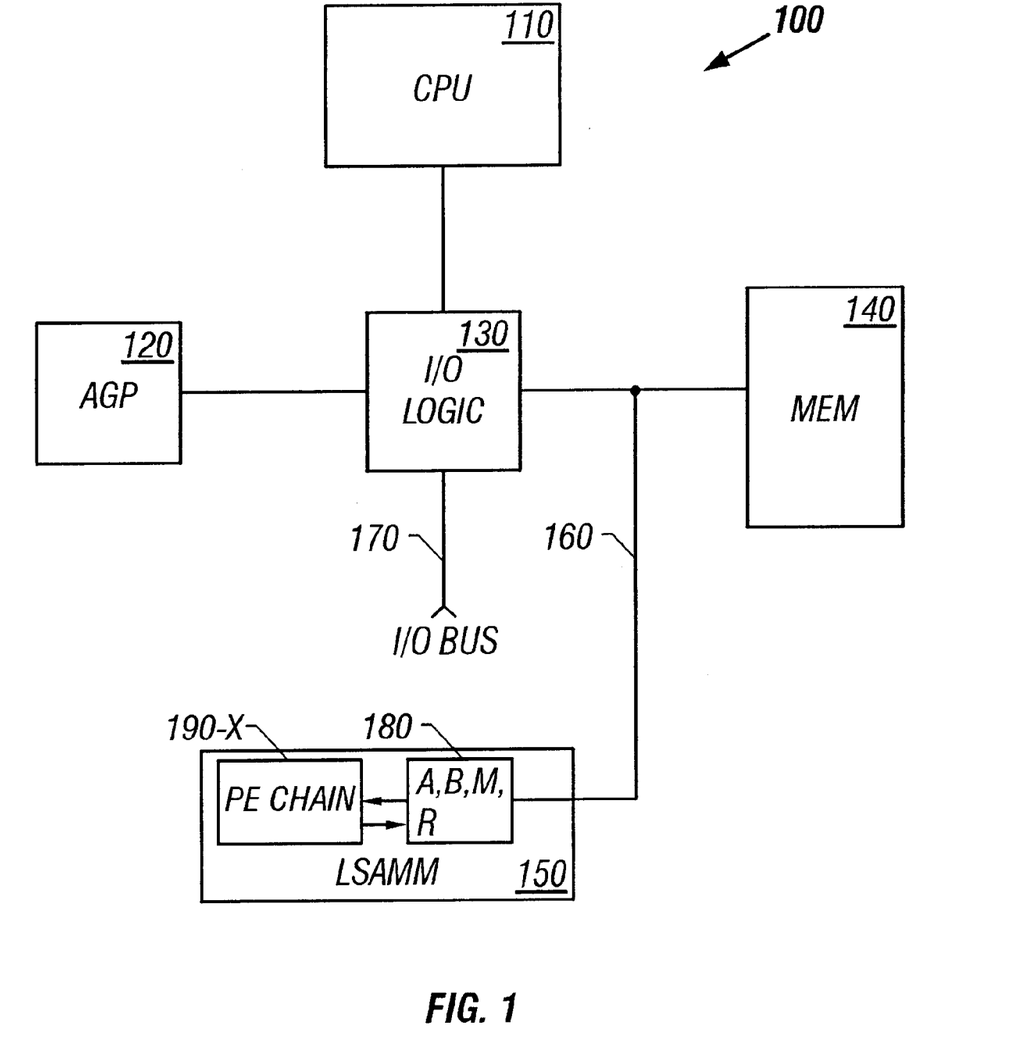
FIG. 1 shows a system according to one embodiment of the invention.

FIG. 1 shows a system according to one embodiment of the invention. In the illustrated embodiment of FIG. 1, system 100 includes a processor (CPU) 110 coupled to LSAMM 150 through input/output (I/O) logic 130 and memory bus 160. In one embodiment, system 100 also includes an accelerated graphics processor (AGP) 120 and a memory 140 coupled to I/O logic 130, and an I/O bus 170 coupling various other devices (not shown) to I/O logic 130. In the embodiment of FIG. 1, the LSAMM 150 includes a Montgomery multiplier (MM) controller 180 connected to memory bus 160, permitting the LSAMM 150 to be addressed by the CPU 110 and/or other devices as a block of memory, but other embodiments have the LSAMM 150 coupled in other ways. LSAMM 150 also includes a chain of serially-connected processing elements (PEs) 190-x connected to MM controller 180 through an end of the chain, so that a set of parameters (e.g., A, B, M) can be provided to the chain, and a result (e.g., R) can be received from the chain, through a PE at the end of the chain. In the embodiment of FIG. 1, any device that can write a set of parameters to the LSAMM 150 and read a final result from the LSAMM 150 can use LSAMM 150 to perform a Montgomery multiplication. Although the terms 'A', 'B', and 'M', are used throughout this disclosure to represent the parameters in a Montgomery multiplication, these are generic designations. Any other terms may be used without departing from the spirit and scope of the invention.

Figure 2:
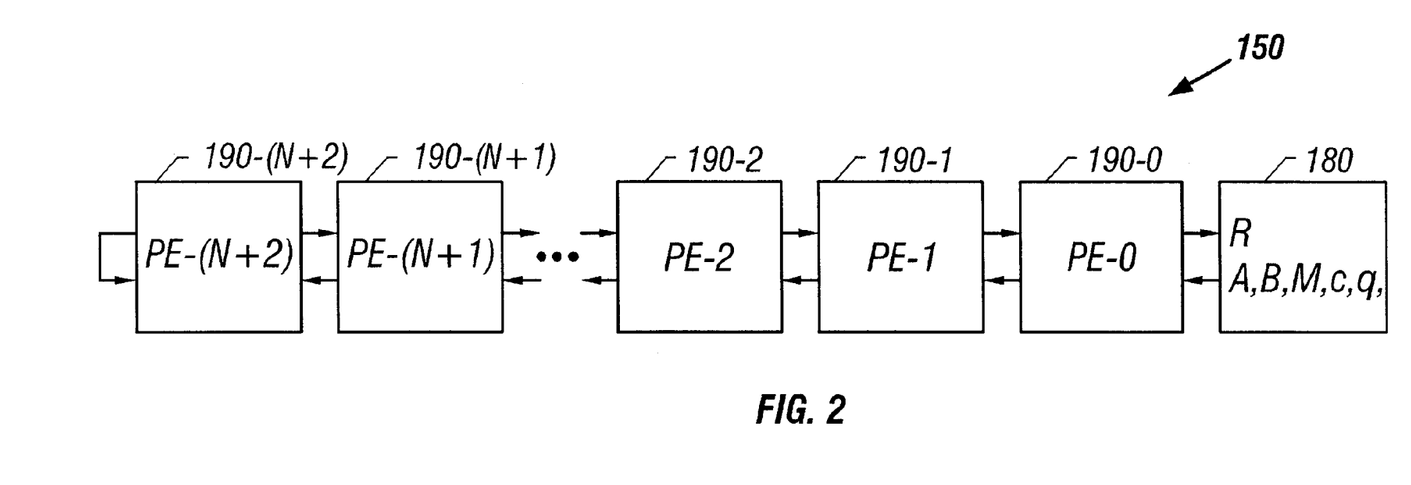
FIG. 2 shows a Montgomery multiplier according to one embodiment of the invention.

FIG. 2 shows a linear systolic array Montgomery multiplier according to one embodiment of the invention. In the illustrated embodiment of FIG. 2, a chain of serially-connected PEs is used to perform a Montgomery multiplication with a set of parameters A, B, M, with each parameter being distributed through the PEs at one digit per PE. A digit is defined as the number of bits of each parameter processed by each PE. In example embodiments used throughout this disclosure, a digit is a four-bit hexadecimal number, and each PE operates on four bits of A and/or four bits of B and/or four bits of M at a time. In other embodiments, digits of other sizes are used, and the logic of each PE differs from the examples accordingly.

The illustrated embodiment of FIG. 2 shows a chain of quantity N+3 PEs, numbered 190-0 through 190-(N+2), and labeled as PE-0 through PE-(N+2). In one embodiment, the LSAMM 150 operates on 1024-bit parameters, and the value of N is 256. The number of PEs in this embodiment is 259, including 256 PEs to hold 256 hexadecimal digits of the parameters, and 3 additional PEs to accommodate interim results during processing. Montgomery multiplier (MM) controller 180 controls the process by transferring parameters A, B, M into the chain one digit at a time through PE-0. MM 180 also passes control codes c and other values q, which are described later, into PE-0 for propagation through the chain of PEs.

In one embodiment, the chain of PEs is set up for a Montgomery multiplication by sequentially passing each parameter B and M to the left, one digit at a time, from MM controller 180 to PE-0, PE-1, PE-2, etc. until each parameter is distributed within PE-0 through PE-N. In one embodiment, multiples of each parameter B and M are calculated within the PEs and stored within the PEs. To perform the actual Montgomery multiplication, parameter A is then sequentially passed one digit at a time to the left from MM controller 180 to PE-0, PE-1, PE-2, etc., to operate on the stored multiples of B and M. When all digits of A have passed through the chain of PEs, the multiplication operation is complete, with the result R residing in the PEs. If the Montgomery multiplications are finished, the result R is then passed to the right through the PEs and into MM controller 180. In one embodiment, if the result R is an initial parameter for the next Montgomery multiplication, as is often the case in RSA operations, multiples of R are calculated and stored in the PEs without being passed into the MM controller 180, and a new parameter A is propagated through the PEs as before to perform the next Montgomery multiplication.

In the illustrated embodiment, parameters A, B, M, and result R each represent a large number that is distributed through the chain of PEs. Control codes c are each small enough to fit into a single PE, and each control code directs the PE in which it is currently located to perform an operation on the values currently contained in that PE. Control codes are passed to the left through the PEs along with the digits of the associated parameters. For each type of operation, the sequence of control codes that passes through the PEs is predetermined. In one embodiment, the predetermined sequences are stored in MM controller 180 and provided to PE-0 as needed. In another embodiment, the predetermined sequences are stored external to MM controller 180 and provided to MM controller 180 for passing on to PE-0.

Values of q are also small enough to fit into each PE, and are passed through the PEs to the left along with the digits of the associated parameters to further define the operation in each PE. In one embodiment, values of q for Montgomery multiplication operations are determined in PE-0 and passed on, while values of q for other operations are predetermined sequences that are stored either in, or external to, MM controller 180 as are the control codes.

During operation of the LSAMM 150, each PE passes information to adjacent PEs in both directions. In one embodiment, each PE performs an internal operation during one clock cycle as specified by that PE's current values of c, q and the digit of A, then waits one clock cycle to pass information to adjacent PEs and to receive information from the adjacent PEs. In one embodiment, the even-numbered PEs perform operations in a specific Montgomery multiplication in the even-number clock cycles and wait for information from adjacent odd-numbered PEs in the odd-numbered clock cycles, while the odd-numbered PEs perform operations in the same Montgomery multiplication in the odd-numbered clock cycles and wait for information from adjacent even-numbered PEs in the even-numbered clock cycles. In one embodiment, these alternating cycles of operating and waiting are created by inputting the needed digits of parameters and control codes into PE-0 on every other clock cycle, and inputting zeroes and a no-operation control code into PE-0 on the intervening clock cycles. This no-operation cycle then propagates down the chain interleaved with the operating cycles. Thus loading a 1024-bit number into a chain of 4-bit PEs takes 512 clock cycles in one embodiment.

Figure 3:
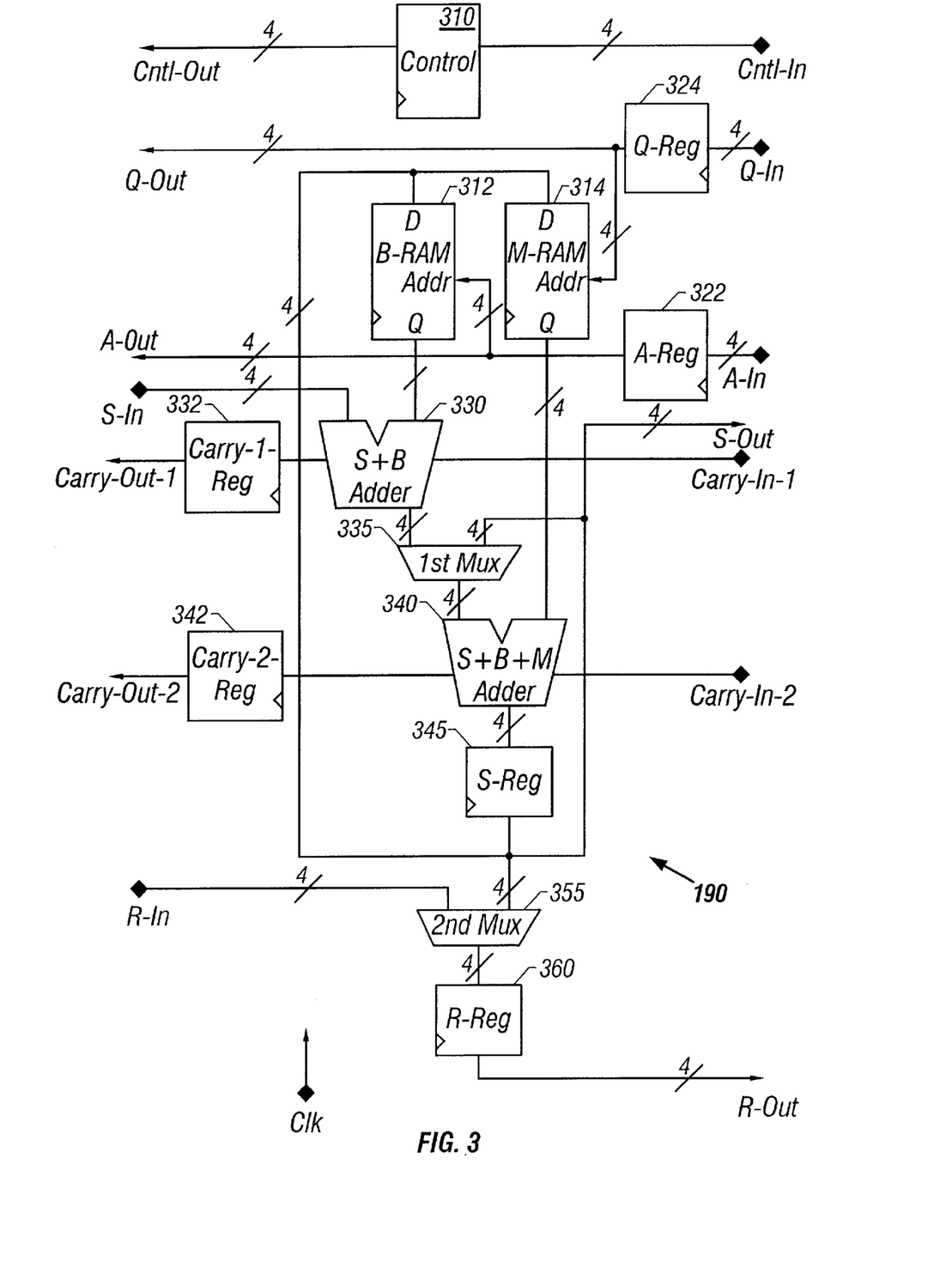
FIG. 3 shows a schematic of a processing element according to one embodiment of the invention.

FIG. 3 shows a schematic of a processing element according to one embodiment of the invention. In the illustrated embodiment of FIG. 3, PE 190 includes PE control logic 310, two storage elements (B-RAM 312 and M-RAM 314), two address registers (Q-register 324 and A-register 322), two adders (S+B Adder 330 and S+B+M Adder 340), two multiplexers (first multiplexer 335 and second multiplexer 355), two carry registers (Carry-1-register 332 and Carry-2-register 342), an accumulation register (S-register 345), and a results register (R-register 360). Although a single PE 190 is described, in one embodiment PE 190 is generic to every PE 190-x in the chain. In the illustrated embodiment, connections shown at the bottom of FIG. 3 are common to multiple PEs, connections shown to the right interface with the PE to the right, and connections shown to the left interface with the PE to the left, with outputs from one PE connected to similarly-named inputs of the adjacent PE. Exceptions are PE-0, which interfaces to MM controller 180 on the right, and PE-(N+2), which has no PE to its left and in one embodiment is coupled to a loopback circuit to permit a loopback of some data. In one embodiment, all PEs have a common clock input Clk. In another embodiment, the clock signal is buffered and split among groups of PEs to avoid signal loading problems.

In one embodiment Clk, Carry-In-1, Carry-Out-1, Carry-In-2, Carry-Out-2, and all internal connections to propagate those signals contain one bit each, while Cntl-In and Cntl-Out contain the number of bits necessary to accommodate the various control codes. All the remaining connections shown in FIG. 3 contain the number of bits being processed by each PE, such as four bits each for the illustrated embodiment. In one embodiment, each PE also includes other inputs and outputs as necessary, e.g., a Reset input (not shown).

In one embodiment, the various logic elements of FIG. 3 perform the following operations: Control logic 310 latches a control code received from the PE to the right, uses that control code to control the logic elements of the present PE during a current clock cycle, and then passes the control code to the PE to the left. Storage element B-RAM 312 is used to store one digit of each multiple of B that is stored in the PE chain, while storage element M-RAM 314 is used to store one digit of each multiple of M that is stored in the PE chain. A-register 322 and Q-register 324 hold the addresses that select the desired locations within B-RAM 312 and M-RAM 314, respectively, (both for reading and for writing) and also pass these addresses to the PE to the left. S+B Adder 330 is used to add the contents of a selected location in B-RAM 312 to the contents of the S-register in the PE to the left, including any carry bit received through the Carry-In-1 input from the S+B Adder in the PE to the right. Carry-1-Register 332 latches any carry bit from the S+B Adder 330 and provides it as a carry bit to the S+B Adder in the PE to the left during the next clock cycle. When the left-hand input of first multiplexer 335 is selected, S+B+M Adder 340 adds the output of S+B Adder 330 to the contents of a selected location in M-RAM 314. When the right-hand input of first multiplexer 335 is selected, S+B+M Adder 340 adds the contents of S-Register 345 to the contents of the selected location in M-RAM 314. Any received carry bit is provided from the PE to the right through the Carry-In-2 input, and any generated carry bit is latched into the Carry-2-Register 342 for use by the PE to the left in the next clock cycle. The output of S+B+M Adder 340 is latched into S-register 345, which acts as an accumulation register for interim results. The output of S-register 345 is distributed to each of the B-RAM 312, the M-RAM 314, the first multiplexer 335, the second multiplexer 355, and the S-Out output. R-register 360 latches the output of S-register 345 if the right-hand input of second multiplexer 355 is selected, and otherwise latches the contents of the R-register in the PE to the left.

In the embodiment of FIG. 3, Clk is used to latch data into the Control logic, into the Q-, A-, S-, R-, Carry-1- and Carry-2-registers, and to clock write operations in the B- and M-RAMs, while both adders, both multiplexers, and the read operations in the B- and M-RAMs are combinatorial, i.e., any change at an input is propagated through to the logic element's output regardless of clock status. In another embodiment, the B- and M-RAMs use a clocked input for read as well as write operations. In one embodiment, clock speed is chosen so that worst-case combinatorial delays in PE 190 are less than one clock cycle. Specific connections from the Clk input to other circuit elements is not shown in FIG. 3 to avoid making the figure overly complex.

Control logic 310 contains the logic necessary to control the operation of PE 190, based on control codes received through Cntl-In. In one embodiment, control logic 310 includes a decoder circuit to convert the control code to necessary control signals. In another embodiment, the control code is simply latched, with each bit of the control code specifying a particular control signal. In one embodiment, the control codes specify operations that include but are not limited to: selecting one of the two inputs of first multiplexer 335, selecting one of the two inputs of second multiplexer 355, writing to B-RAM 312, writing to M-RAM 324, resetting one or more of the A, Q, S and R registers, and inhibiting the clock signal to various logic elements.

Because a Montgomery multiplication operates with multiples of B and M, one embodiment pre-calculates the multiples within the PEs, using the same logic that is used for a Montgomery multiplication. In the illustrated embodiment of FIG. 3, the storage elements include random access memories (RAM), labeled B-RAM and M-RAM to indicate the parameters being stored. Another embodiment uses a type of memory technology other than RAM for storage elements B-RAM 312 and M-RAM 314. Collectively, all the B-RAMs 312 in the PE chain provide storage space for values of (0×B), (1×B), (2×B), etc. The B-RAM 312 of each PE provides storage space for one digit of each multiple of B. In one embodiment in which each PE operates on a hexadecimal digit, B-RAM 312 includes 16 4-bit storage locations to hold corresponding digits of (0×B) through (15×B), while M-RAM 314 includes 16 4-bit storage locations to hold corresponding digits of (0×M) through (15×M). In an embodiment in which each PE processes a number of bits other than four, the number of locations in each RAM are changed accordingly to address and store the required number of multiples.

The logic of PE 190 can be used in various ways, depending on the operation being performed at the time. In one embodiment, the PEs perform each of the following, which are described in more detail in the following sections:

1) Load initial parameters into the B-RAMs and/or M-RAMs.
2) Pre-calculate multiples of B and store in the B-RAMs.
3) Pre-calculate multiples of M and store in the M-RAMs.
4) Perform a Montgomery multiplication.

Load Initial Parameters into the B-RAMs and/or M-RAMs

In an LSAMM, each Montgomery multiplication starts with initial parameters B and M in the PEs. Under some conditions, the result of one Montgomery multiplication is an initial parameter for the next Montgomery multiplication, so that initial parameter does not have to be loaded. In one embodiment, at the end of a multiplication S-register 345 contains a digit of the accumulated result, which is then loaded into B-RAM 312 (or M-RAM 314) at an address specified by A-register 322 (or Q-register 324) as a digit of an initial parameter for the next Montgomery multiplication.

Under other conditions, initial parameters are not contained in the PE, so the initial parameters are supplied from an external source. In one embodiment, an initial parameter is fed into an end of the chain and propagated through the S-registers of the PEs until each digit is in the S-register of its proper PE, whereupon the digit is written into the corresponding RAM. With reference to FIG. 3, by zeroing the outputs of B-RAM 312 and M-RAM 314, and selecting the left-hand input of first multiplexer 335, adders 330 and 340 will pass through the value at S-In unchanged and load it into S-register 345, from where the value is available at S-Out, thus enabling propagation of a value through the S-registers. However, because the S-registers are designed to pass data from left to right, in one embodiment the parameters begin propagating through the S-registers starting with PE-(N+2). In one embodiment, MM controller 180 has a separate output to S-In of PE-(N+2) and feeds the digits of the initial parameter into PE-(N+2). In another embodiment, MM controller 180 feeds the digits of the initial parameter into an address register of PE-0 and propagates the digits through the chain of PEs from right to left. A loopback circuit then loops the address register output of PE-(N+2) back to the S-In input of PE-(N+2), from where the digits are propagated from left to right through the S-registers as just described. Embodiments of the loopback operation and circuits are described in the following paragraphs.

Figure 4A:
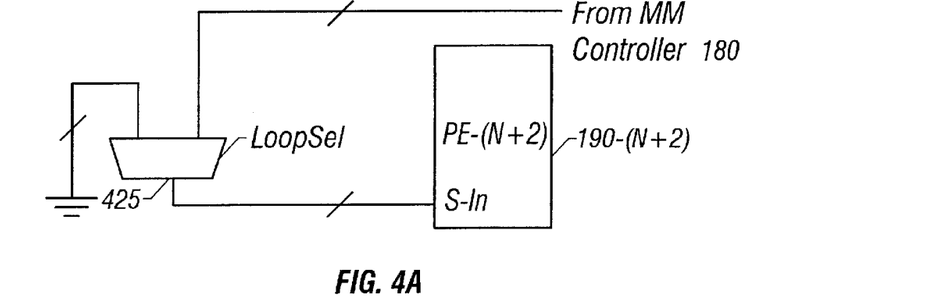
FIG. 4A shows loopback logic to directly load initial parameters into the chain of processing elements, according to one embodiment of the invention.
Figure 4B:
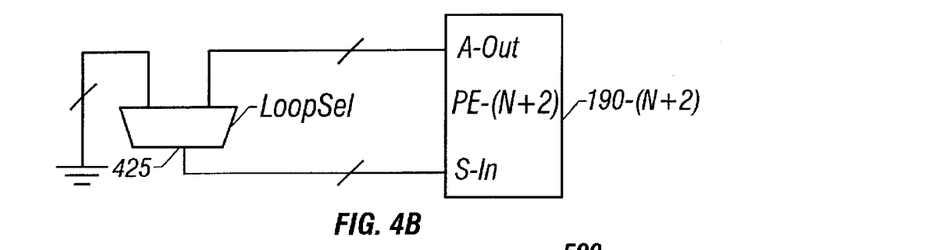
FIG. 4B shows loopback logic to indirectly load initial parameters into the chain of processing elements, according to one embodiment of the invention.
Figure 5:
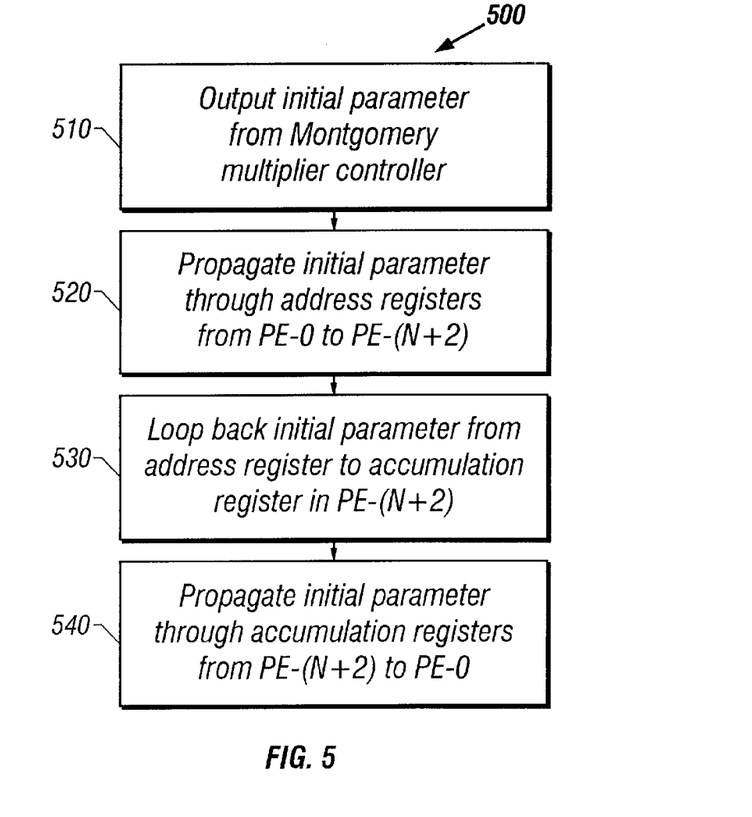
FIG. 5 shows a flowchart of an implementation using loopback logic, according to one embodiment of the invention.

FIG. 4A shows loopback logic to directly load initial parameters into the chain of processing elements, according to one embodiment of the invention. FIG. 4B shows loopback logic to indirectly load initial parameters into the chain of processing elements, according to one embodiment of the invention. FIG. 5 shows a flowchart of an implementation using loopback logic, according to one embodiment of the invention. Flow chart 500 of FIG. 5 is described with respect to the loopback logic of FIGS. 4A, 4B, and further with respect to the PE of FIG. 3. In block 510 of flow chart 500, digits of an initial parameter are output from MM controller 180. In one embodiment using the circuit of FIG. 4A, the digits of the initial parameter are provided directly to loopback multiplexer 425 and block 520 is skipped. In another embodiment using the circuit of FIG. 4B, the digits of the initial parameter are output to the A-register 322 of PE-0, from where they are propagated in block 520 through the A-registers of the chain of PEs until reaching PE-(N+2). From the A-register 322 of PE-(N+2), the digits of the initial value are provided to loopback multiplexer 425. In one embodiment, the Q-registers are used instead of the A-registers to propagate the digits of the initial parameter from PE-0 to PE-(N+2). In the embodiments of both FIGS. 4A and 4B, the digits of the initial value are looped back through loopback multiplexer 425 to the S-In input of PE-(N+2) at block 530. At block 540, the digits of the initial parameter are propagated through the S-registers until each digit reaches its proper PE in the manner previously described.

When loading initial parameters, the signal LoopSel selects the right-hand input of loopback multiplexer 425, so that the digits of the initial parameter are fed into S-In. If an initial parameter is not being loaded into the chain of PEs, the signal LoopSel selects the left-hand input of loopback multiplexer 425, which feeds zeros into S-In. In one embodiment, the signal LoopSel is provided by MM controller 180. In another embodiment, the signal LoopSel is generated by additional loopback logic (not shown) in response to a control code or a sequence of control codes that only the loopback logic recognizes.

In another embodiment, loopback multiplexer 425 is connected to an interior PE (with, for example, loopback multiplexer 425 connected to PE-N rather than PE-(N+2), with the left-hand input of loopback multiplexer 425 connected to the S-Out output of the PE to the left. This embodiment permits initial parameters to be loaded without having to pass data through the extra PEs at the end of the chain that normally don't hold any part of the initial parameters.

Pre-calculate Multiples of B and Store in the B-RAMs

In the illustrated embodiment of FIG. 3, calculate a digit of each multiple of B and store those digits in the B-RAM 312, by executing the following in each PE:

1) Clear the contents of location 0 in B-RAM 312 to zero by writing all zeroes into location 0. In one embodiment, this operation is performed by zeroing the contents of the A-register 322 to select location 0, and zeroing the contents of S-register 345 to provide the data for writing into location 0.
2) Load the correct digit of B into S-register 345 through the process previously described in the section 'Load Initial Parameters into the B-RAMs and/or M-RAMs'.
3) Clear the Q register, set M-RAM to 'write', and write the digit of B from S-register 345 into location 0 of M-RAM 314. M-RAM 314 is a temporary holding place for this digit, and can be cleared at the end of the pre-calculation steps.
4) Set M-RAM 314 to 'Read' and leave Q-register 324 cleared to continuously read the digit of B from M-RAM 314. Set B-RAM 312 to 'write', clear the S-register 345 and set the A-register 322 to '0'.
5) Select the right-hand input of multiplexer 335 so that the S+B+M Adder 340 will add the digit of B from the M-RAM 314 to the current value in S-register 345, and store that sum as the new value in S-register 345, including the effect of any relevant carry bit received at Carry-In-2. (Any carry bit produced by this addition is latched into Carry-2-Reg 342 for use by the PE to the left.)
6) Increment the value in the A-register 322 with each new value in the S-register 345 so that the changing value in the S-register 345 is stored into successive locations 0, 1, 2, 3, etc. in the B-RAM 312. After incrementing through all multiples of B, the result in the B-RAM 312 is that location 0 contains a digit of 0×B=0, location 1 contains the same digit of 1×B, location 2 contains the same digit of 2×B, location 3 contains the same digit of 3×B, etc. When this process has been applied to PEs 0 through N, the pre-calculation and storage of multiples of B is complete.

Pre-calculate Multiples of M and Store in the M-RAMs

In the illustrated embodiment of FIG. 3, calculate a digit of each multiple of M and store those digits in the M-RAM 314, by executing the following in each PE:

1) Clear the contents of M-RAM by writing zeroes into each location. In one embodiment, this is performed by zeroing the contents of the S-register 345 and repeatedly writing that zero value to the M-RAM while incrementing the contents of Q-register 324.
2) Load the correct digit of M into S-register 345 through the process described above under the section 'Load Initial Parameters into the B-RAMs and/or M-RAMs'.

3) Clear the Q register, and write the digit of M from S-register 345 into location 0 of M-RAM 314. Location 0 is a temporary holding place for this digit, and can be cleared at the end of the pre-calculation steps.

4) Select the right-hand input of multiplexer 335 so that the S+B+M Adder 340 will add a value read from the M-RAM 314 to the current value in S-register 345, and store that sum as the new value in S-register 345, including the effect of any relevant carry bit received at Carry-In-2. (Any carry bit produced by this addition is latched into Carry-2-Reg 342 for use by the PE to the left.). In this manner, the value in S-register 345 will successively change through the same digit of M, 2M, 3M, etc. with each addition.

5) Alternate the contents of Q-register 324 between an incrementing counter and zero: 1, 0, 2, 0, 3, 0, etc. When the Q-register holds a zero, place M-RAM 314 in a read state to read the value of M out of location 0. When the Q-register holds one of the incrementing counter values, place M-RAM in a write state to write the accumulated value from S-register 345 into that location. In this manner, the digit of M will be read from location 0 in M-RAM 314 and added to the accumulated value in S-register 345, including the effect of any received carry bit. The sum will then be written to a location in M-RAM 314 that increments with each write operation. The result in the M-RAM 314 is that location 1 contains a digit of M, location 2 contains the same digit of 2M, location 3 contains the same digit of 3M, etc.

6) Zero the S-register 345 and the Q-register 324 and write the zero contents of S-register 345 into location 0 of M-RAM 314. When the process has been applied to PEs 0 through N, pre-calculation and storage of multiples of M is complete.

In one embodiment for implementing the foregoing operations, the contents of A-register 322 and Q-register 324 are cleared to zero through a control code. In another embodiment, the contents of A-register 322 and Q-register 324 are set to zero by propagating the zero value through the PE chain as are other values in the A- and Q-registers.

Perform a Montgomery Multiplication

In the illustrated embodiment of FIG. 3, each PE performs in the following manner in a Montgomery multiplication: The A-register 322 latches a digit of A to select a digit of a multiple of B in the B-RAM 312, the Q-register 324 latches a q value to select a digit of a multiple of M in the M-RAM 324, and Control logic 310 latches a control code to control the logic elements of PE 190 during the current clock cycle. All three values are received from the PE to the right and are passed on to the PE to the left on the following clock cycle. Using the S+B Adder 330, the selected location of B-RAM 312 is added to the current contents of the S-register in the PE to the left. Carry bits are propagated from right to left using the Carry-In-1 input and the Carry-Out-1 output so that the S+B Adder 330 of the current PE acts in concert with the S+B Adders of the other PEs to add the value of a selected multiple of B to a right-shifted (by one digit) value of an interim result in the S registers. In a similar manner, the S+B+M Adder 340 uses propagating carry bits at Carry-In-2 and Carry-Out-2 to perform a larger addition in concert with the S+B+M Adders of the other PEs. The left-hand input of first multiplexer 335 is selected, so that the output of the S+B Adder 330 is added to the multiple of M in the selected location of M-RAM 314. The sum is latched into S-register 345 as the new interim result, completing the operation that was defined by the control code of the current clock cycle. As previously described, a clock cycle of waiting for information from the adjacent PEs follows, and then the process just described repeats as many times as necessary to propagate all digits of A through the PE. When all digits of A have propagated through the PE, the value in S-register 345 is a digit of the result of the Montgomery multiplication. When all digits of A have propagated through all PEs, the Montgomery multiplication is complete.

If the result is to be used as the new initial parameter in a series of consecutive Montgomery multiplications, the contents of S-register 345 are then loaded into B-RAM 312 as a digit of B, and multiples are calculated as previously described above under 'Pre-calculate multiples of B and store in the B-RAMs'. If the result is a final result, the result is shifted through the PEs to the right until all digits of the result have shifted into MM controller 180, from where the result can be made available to other devices in the system. In one embodiment, the contents of S-Register 345 are loaded into R-register 360 through the right-hand input of multiplexer 355 in every PE, Hi, and then the contents of all R-registers 360 are passed through each other to the right into MM controller 180 by selecting the left-input of the multiplexer 355 in every PE. In another embodiment, R-register 360 and second multiplexer 355 are not included in the PEs, and the result is passed to the right through the S-registers of every PE using the S-In and S-Out connections, in much the same manner as original parameters were loaded as described above under 'Load Initial Parameters into the B-RAMs and/or M-RAMs.

The foregoing description is intended to be illustrative and not limiting. Variations will occur to those of skill in the art. Those variations are intended to be included in the invention, which is limited only by the spirit and scope of the appended claims.

I claim:

1. An apparatus, comprising:
   a first storage element in a first processing element of a linear systolic array Montgomery multiplier; and
   a first accumulation register in the first processing element coupled to a second accumulation register in an adjacent second processing element to propagate a first initial parameter through the first and second accumulation registers, the first accumulation register further coupled to the first storage element to load a portion of the first initial parameter into the first storage element.

2. The apparatus of claim 1, wherein:
   the first accumulation register is further to load a portion of a first set of multiples of the first initial parameter into the first storage element.

3. The apparatus of claim 1, wherein:
   the first processing element further includes a second storage element coupled to the first accumulation register to store a portion of a second initial parameter propagated through the first and second accumulation registers.

4. The apparatus of claim 3, wherein:
   the first accumulation register is further to load a portion of a second set of multiples of the second initial parameter into the second storage element.

5. The apparatus of claim 1, wherein:
   the first processing element further includes a first address register coupled to the first storage element to address locations in the first storage element and coupled to a second address register in the second processing element to propagate the first initial parameter through the first and second address registers before propagating the first initial parameter through the first and second accumulation registers.

6. The apparatus of claim 5, wherein:
the first initial parameter is to propagate through the first and second address registers in an opposite direction from propagation through the first and second accumulation registers.

7. The apparatus of claim 1, wherein:
the first accumulation register is further to accumulate interim results during a Montgomery multiplication.

8. A system, comprising:
a processor;
a memory coupled to the processor; and
a set of serially-connected processing elements in a linear systolic array Montgomery multiplier coupled to the processor and having accumulation registers to propagate an initial parameter through the accumulation registers and to store the initial parameter from the accumulation registers into storage elements in the processing elements before beginning a Montgomery multiplication, wherein the accumulation registers are to hold interim results during the Montgomery multiplication.

9. The system of claim 8, wherein:
the set of serially-connected processing elements further includes address registers coupled to the storage elements to address locations in the storage elements, and
the address registers are further to propagate the initial parameter through the address registers before propagation of the initial parameter through the accumulation registers.

10. The system of claim 9, wherein:
the address registers are further to propagate the initial parameter through the address registers in a direction opposite propagation of the initial parameter through the accumulation registers.

11. An apparatus, comprising:
a first storage element in a first processing element of a linear systolic array Montgomery multiplier;
an adder in the first processing element coupled to the first storage element to calculate a portion of multiples of a first initial parameter; and
an accumulation register in the first processing element coupled to the adder and the first storage element to load the portion of multiples of the first initial parameter into the first storage element;
wherein the first storage element, the adder, and the accumulation register are further to perform a Montgomery multiplication with the portion of multiples of the first initial parameter.

12. The apparatus of claim 11, wherein:
the first processing element further includes a second storage element coupled to the adder and the accumulation register; and
the adder is to calculate a portion of multiples of a second initial parameter and the accumulation register is to load the portion of multiples of the second initial parameter into the second storage element.

13. The apparatus of claim 12, further comprising:
a second processing element in the linear systolic array Montgomery multiplier;
wherein the accumulation register is further to propagate the first initial parameter through the first and second processing elements before the calculation by the adder.

14. The apparatus of claim 13, wherein:
the first processing element further includes an address register to address locations within the first storage element and to propagate the first initial parameter through the first and second processing elements before propagation through the accumulation register.

15. The apparatus of claim 14, wherein:
the propagation through the address register is in a direction opposite the propagation through the accumulation register.

16. The apparatus of claim 14, further including:
logic coupled to the address register and the accumulation register to loop the first initial parameter from the address register to the accumulation register.

17. A method, comprising:
propagating an initial parameter through a set of processing elements in a linear systolic array Montgomery multiplier; and
loading the initial parameter into storage elements in the set of processing elements.

18. The method of claim 17, wherein:
said propagating the initial parameter includes propagating the initial parameter through accumulation registers in the processing elements.

19. The method of claim 18, further comprising:
propagating the initial parameter through address registers in the processing elements in a direction opposite to said propagating through the accumulation registers; and
looping back the initial parameter at a particular processing element before said propagating the initial parameter through the accumulation registers.

20. A machine-readable medium that provides instructions, which when executed by a set of one or more processors, cause said set of processors to perform operations comprising:
loading an initial parameter and control codes into a linear systolic array Montgomery multiplier to cause processing elements in the linear systolic array Montgomery multiplier to propagate the initial parameter through the processing elements and to load the initial parameter in storage elements in the processing elements.

21. The medium of claim 20, wherein:
said propagating the initial parameter includes propagating the initial parameter through accumulation registers in the processing elements.

22. The medium of claim 21, wherein:
said propagating the initial parameter further includes propagating the initial parameter through address registers in the processing elements in an opposite direction from said propagating through the accumulation registers and looping back the initial parameter at a particular processing element before propagating through the accumulation registers.

23. The medium of claim 20, further comprising:
loading control codes into the linear systolic array Montgomery multiplier to cause the processing elements to pre-calculate multiples of the initial parameter in the processing elements and to store the multiples in the storage elements.

* * * * *

UNITED STATES PATENT AND TRADEMARK OFFICE
CERTIFICATE OF CORRECTION

PATENT NO. : 6,625,631 B2
DATED : September 23, 2003
INVENTOR(S) : Ruehle

It is certified that error appears in the above-identified patent and that said Letters Patent is hereby corrected as shown below:

Column 10,
Line 22, after "PE,", delete "Hi,".

Signed and Sealed this

Second Day of March, 2004

JON W. DUDAS
*Acting Director of the United States Patent and Trademark Office*